United States Patent [19]

Herron

[11] 4,262,320
[45] Apr. 14, 1981

[54] H-SWITCH CONFIGURATION FOR CONTROLLING LATCHING SOLENOIDS

[75] Inventor: Lee F. Herron, Santa Barbara, Calif.

[73] Assignee: General Motors Corporation, Detroit, Mich.

[21] Appl. No.: 35,525

[22] Filed: May 3, 1979

[51] Int. Cl.³ .......................................... H01H 47/32
[52] U.S. Cl. .................................... 361/191; 361/208; 307/241
[58] Field of Search ............... 361/191, 208, 166, 186, 361/171, 88, 86; 307/262, 241

[56] References Cited

U.S. PATENT DOCUMENTS

| | | | |
|---|---|---|---|
| 3,631,397 | 12/1971 | Mitsuhashi et al. | 361/191 X |
| 3,678,344 | 7/1972 | Wedmore | 361/191 |
| 3,748,537 | 7/1973 | Vigini | 361/166 X |
| 3,931,550 | 1/1976 | Dalpee | 361/186 |
| 4,040,119 | 8/1977 | Dalpee et al. | 361/191 |

Primary Examiner—Patrick R. Salce
Attorney, Agent, or Firm—C. R. Meland

[57] ABSTRACT

A circuit for selectively controlling bidirectional energization of a plurality of latching solenoid coils and incorporating electrical failure detection means therein. The coils are connected in a series chain and a plurality of independently actuable switching means are provided for connecting a positive voltage potential, a negative voltage potential, or no voltage potential to any of a plurality of terminals defined by the ends of the chain and the junctions between two adjacent coils of the chain. The solenoid coils are energized by a momentary current pulse, and the switching means are selectively actuated to control the direction of the energizing current through any of the coils. A voltage divider establishes voltage potentials at the ends of the chain which vary from a predetermined value during a failure mode of operation of the circuit.

1 Claim, 1 Drawing Figure

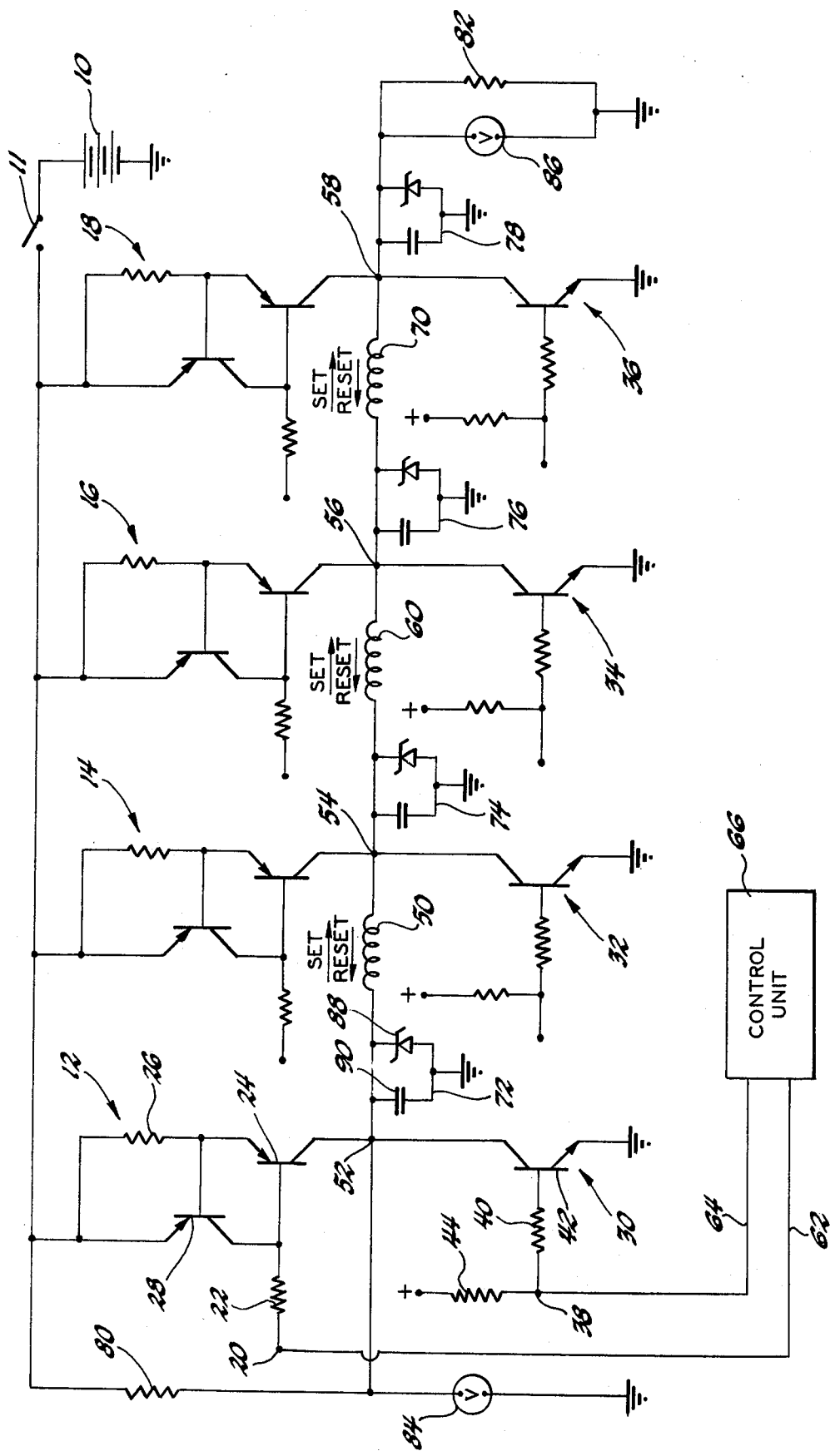

H-SWITCH CONFIGURATION FOR CONTROLLING LATCHING SOLENOIDS

This invention relates to a circuit for selectively controlling bi-directional energization of a plurality of latching solenoids and for detecting a failure therein.

A latching solenoid is a single coil electromechanical device wherein momentary energization of the coil actuates a movable member (plunger) to one of two positions. The position to which the movable member is actuated depends upon the direction of current flow through the coil; magnetic or mechanical means maintain the movable member in the actuated position until the coil is reenergized by a current flowing in the opposite direction.

Latching solenoids are generally desirable in control applicatons since only a short current pulse actuates the movable member and no holding current is required. They may be advantageously used for example, to control the shift valves of a fluidic automatic transmission since a power failure will not affect the position of the latched control members. In such an application, it is desirable to provide failure detection means for the electrical circuit since improper actuation of a solenoid coil due to an electrical failure could lead to undesired and inconvenient operation of the transmission. Should there be a failure, the means for energizing the solenoid coils may be disabled so as to prevent improper actuation.

A latching solenoid is typically energized by connecting a normally open switch pair to each terminal of the soienoid coil so that either terminal may thereby be selectively connected to one of two different voltage potentials or to no voltage potential. By momentarily closing one switch at each terminal of the coil, the direction of the current flow through the coil may be selectively controlled to change the position of the movable member. This switching configuration is commonly referred to as an H-switch since the switch pairs may be schematically arranged about the solenoid coil to resemble an uppercase H. As the number of latching solenoids to be controlled increases, the single H-switch configuration becomes undesirable in terms of the number of control wires and switches required. Furthermore, it is inconvenient to provide failure detection means for each H-switch.

It is accordingly, an object of this invention to provide a switching arrangement for controlling the bi-directional energization of a plurality of latching solenoids.

It is another object of this invention to provide a switching arrangement for controlling the operation of a plurality of latching solenoids, from which information relating to the occurrence of an electrical failure therein may be obtained.

These objects are carried forward by connecting the latching solenoid coils in a series chain and connecting a normally open switch pair to each end terminal of the chain and to each junction terminal between adjacent coils. One switch of each switch pair is connected to a source of voltage and the other switch is connected to a reference or ground potential. In this way, each terminal may be selectively connected to either of the voltage potentials or to no voltage potential. A resistive voltage divider conducts a small amount of sense current through the solenoid coil chain, establishing known voltage potentials at each terminal thereof so that substantial deviation therefrom may be detected to determine if a failure has occurred.

The single drawing FIGURE illustrates a circuit made in accordance with this invention.

Referring now to the single drawing FIGURE, reference numerals 50, 60 and 70 each designate the single coil of a latching solenoid or relay. Each coil is magnetically coupled with a movable member (not shown) so that momentary energization of the coil causes the movable member to be shifted to one of two positions. The movable member may control, for example, the position of a valve spool in a shift valve of a vehicular automatic transmission. An energizing current through the coil is one direction shifts the valve spool to a first position while an energizing current in the opposite direction shifts the valve spool to a second position. In either case, the energizing current is only momentarily applied to the coil; magnetic or mechanical latching means maintain the movable member in the position last shifted to. A device conforming to the above-described specifications is the Model No. 40150 latching relay manufactured by FEMA Corporation, Portage, Michigan.

Solenoid coils 50, 60 and 70 are connected in a series chain forming junction terminals 54 and 56 and end terminals 52 and 58. The solid state switches designated by reference numerals 12, 14, 16 and 18 are each operable to selectively connect a source of direct voltage such as the positive terminal of automotive storage battery 10 to terminals 52, 54, 56 and 58 respectively. Since each of the above mentioned switches are identical, only one will be described in detail. Switch 12 comprises control terminal 20, resistor 22, power transistor 24, resistor 26, and current limiting transistor 28. Control terminal 20 is normally connected to a positive voltage potential holding transistor 24 in a non-conductive state. When terminal 20 is connected to ground potential, transistor 24 is biased into a conductive state allowing current to flow from the positive terminal of battery 10 through resistor 26 and the emitter-collector circuit of transistor 24. If the current through transistor 24 exceeds a predetermined limit, the voltage across resistor 26 becomes sufficient to bias transistor 28 into a conductive state. Under these circumstances, transistor 28 operates to limit the current through transistor 24 by raising the voltage potential at the base of transistor 24. Under normal conditions, the current limiting operation of transistor 28 is not necessary; transistor 28 is only biased conductive if an unexpectedly large amount of current flows through resistor 26. Thus, if terminal 52 were accidentally connected to ground potential, the current limiting operaton of transistor 28 would limit the current through the emitter-collector circuit of transistor 24 to a safe value.

The solid state switches designated by reference numerals 30, 32, 34 and 36 are each operable to connect a source of ground potential such as the negative terminal of an automotive storage battery 10 to terminals 52, 54, 56 and 58 respectively. Since each of the above mentioned switches are identical only one will be described in detail. Switch 30 comprises control terminal 38, resistors 40 and 44, and power transistor 42. One side of resistor 44 is connected to the positive terminal of battery 10, as indicated by the symbol "+". Control terminal 38 is normally connected to ground potential, diverting bias current from the positive terminal of battery 10 through resistor 44 to ground potential, and holding transistor 42 in a non-conductive state. When terminal 38 is connected to a positive potential, transistor 42 is biased into a conductive state allowing current to flow from terminal 52 through the collector-emitter circuit of transistor 42 to ground potential.

All of the switches are normally in a nonconductive state so that a coil may be energized only be rendering two of the switches conductive. Switches 12, 14, 30 and 32 control the bi-directional energization of solenoid coil 50. Similarly, switches 14, 16 32, 34 control the energization of solenoid coil 60 and switches 16, 18, 34 and 36 control the energization of solenoid coil 70. To energize a coil, one terminal of the coil must be connected to either the positive potential or ground potential, and the other terminal must be connected to the other of the two voltage potentials. For example, when switches 12 and 32 are momentarily rendered conductive, a momentary energizing current flows from positive terminal of battery 10 through switch 12 to end terminal 52, through solenoid coil 50 to junction terminal 54, and through switch 32 to ground potential. This causes a movable member associated with solenoid coil 50 to be actuated to a first or "set" position. When switches 14 and 30 are momentarily rendered conductive, an energizing current flows through solenoid coil 50 in the opposite direction, causing the movable member to be actuated to a second or "reset" position. In either case, the switches need only be rendered conductive for a short time duration, such as 50 milliseconds.

Each of the solid state switches may be controlled by applying the appropriate voltage potential to the respective control terminals. This may be accomplished, as will be well known to those skilled in the art, with a bank of single-pole, double-throw switches, whereby each control terminal may be connected to either a positive potential or ground potential. In an application for controlling the shift valves of an automatic transmission, the desired voltage potential may be applied to the control terminals by the output of a microprocessor so that the shifting sequence of the transmission may be performed in accordance with various vehicular parameters to which the microprocessor is responsive. For either arrangement, the switching circuitry is designated schematically by control unit 66, which is conected via conductors 62 and 64 to control terminals 20 and 38 respectively. The remaining circuit connections between control unit 66 and the other control terminals are omitted for the sake of convenience.

Protective circuits 72, 74, 76 and 78, each comprising a Zener diode 88 and a capacitor 90 connected in parallel, are provided at each terminal of the solenoid coil chain. As will be well known to those skilled in the art of electronics, the protective circuits operate to conduct the transient currents associated with the energization and deenergizaton of the solenoid coils to ground potential.

Resistor 80 is connected between positive terminal of battery 10 and end terminal 52 and resistor 82 is connected between end terminal 58 and ground potential. A small sense current is thereby conducted from positive terminal of battery 10 through the solenoid coil chain to ground potential. Resistors 80 and 82 are of equal resistive value, chosen so as to limit the sense current to a predetermined amount, considerably less than that required to actuate the movable members associated with the solenoid coils. In the preferred embodiment, battery 10 is a standard 12 volt automotive storage battery and resistors 80 and 82 are each 3,000 ohms so that the sense current is limited to approximately 2 milliamps depending upon the precise terminal voltage of the battery. By contrast, an energizing current of approximately 300 milliamps is required to actuate a movable member associated with a respective solenoid coil. Resistors 80 and 82 form a voltage divider establishing known voltage potentials at end terminals 52 and 58. Accordingly, the voltage potential at an end terminal with respect to ground potential may be monitored as a means of failure detection. To this end, voltmeter 84 is connected between terminal 52 and ground potential and voltmeter 86 is connected between terminal 58 and ground potential. It should be understood that the specific method of monitoring the end terminal voltages forms no part of this invention. Although simple voltmeters have been illustrated, the end terminal voltages may also be monitored by a microprocessor having an analog-to-digital converter, or by other electronic circuitry wherein the meansured voltage is compared to the expected voltage for a given desired mode of operation of the system. As explained below, there are three expected voltage levels for each end terminal depending upon the mode of operation of the circuit.

Ignition switch 11 is connected in series with the positive terminal of battery 10 and resistor 80 so that there is no current path through the circuit when ignition switch 11 is open, corresponding to an "off" position of the vehicle ignition lock (not shown).

As noted above, two switches must be conductive in order to energize any solenoid coil. Put another way, a single failure cannot result in the improper actuation of a solenoid. However, an improper actuation may occur if an attempt is made to energize a solenoid in the presence of a failure. For example, if junction terminal 56 is accidentally shorted to ground potential, and an attempt is made to reset solenoid coil 50, solenoid coil 60 will be improperly actuated to the set position through momentarily closed switch 14 and grounded junction terminal 56. Other failures that may result in an improper actuation include the shorting of any other solenoid terminal to ground potential (as discussed above), the shorting of any solenoid terminal to the positive potential, and improper conduction of any switch in the circuit. When such a failure occurs, an improper actuation of a solenoid coil may be prevented by disabling control unit 66. As applied to the operaton of the shift valves in an automatic transmission, this results in a failure mode wherein the transmission is maintained in the position that existed just prior to the occurrence of the failure, thereby averting possible destruction of the transmission due to an improper solenoid actuation. Failures of the above described type may be detected by monitoring the voltage potential at end terminal 52 with voltmeter 84 when no circuit switches are conductive. With no switches conductive, the voltage potential at both end terminals should be approximately one-half of the positive voltage potential since the resistance of the solenoid coils (about 11 ohms each) is negligible compared with that of resistors 80 and 82. Any of the above described failures will result in an end terminal voltage that substantially deviates from that expected In such a case, a mechanism or circuit (not shown) responsive to the voltage deviation may warn the operator and prevent further actuation of the circuit switches to thereby avoid the improper actuation of a solenoid. The end terminal voltage may also be used to detect an open-circuit failure in the solenoid coil chain.

Further failure detection may be obtained when a solenoid coil is being actuated by additionally monitoring the voltage potential at end terminal 58, as with voltmeter 86. When any of the solenoid coils are being energized to a set position, the voltage potential at terminal 52 should approach the positive terminal voltage of battery 10, and the voltage potential at end terminal 58 should be approximately ground potential. When any of the solenoid coils are being energized to a reset position, the voltage potential at end terminal 52 should be approximately ground potential, and the voltage potential at end terminal 58 should approach the positive terminal voltage of battery 10. The second type of failure is detected if either end terminal voltage substantially deviates from that expected under the circumstances. Failures of this type include inoperative circuit switches, or a failure in control unit 66. Since this type of failure might lead to improper or inconvenient operation of the controlled device, a mechanism or circuit (not shown) responsive to the end terminal voltage deviation may warn the operator and prevent any further solenoid actuation.

Two or more of the solenoid coils may be energized simultaneously if desired by momentarily closing the appropriate switches. For example, solenoid coil 60 may be set and solenoid coil 70 reset by momentarily closing switches 14, 18 and 34. Similarly, solenoid coils 60 and 70 may be set by momentarily closing switches 14 and 36. Furthermore, it should be appreciated that the principles of this invention equally apply to a solenoid coil chain having more than three solenoid coils.

In a preferred embodiment of this invention, wherein battery 10 is a standard 12-volt automotive storage battery, and wherein the output of a microprocessor is applied to the control input of each of the switches, the following circuit elements specifications apply:

resistor 80: 3,000 ohms
resistor 82: 3,000 ohms
resistors 22: 6,200 ohms
transistors 28: 2N2907a
resistors 26: 0.619 ohms
transistors 24: TIP145
resistors 40: 2,400 ohms
resistors 44: 1,500 ohms
transistors 42: 2N6044
Zener diodes 88: UZ718
capacitors 90: 0.1 uF The embodiments of the invention is which an exclusive property or privilege is claimed are defined as follows:

1. A system for selectively controlling bi-directional energization of a plurality of latching solenoid coils which are operable to actuate a movable member from one position to another comprising:

a plurality of latching solenoid coils connected in a series chain forming end terminals at each end of said chain and junction terminals between adjacent solenoid coils;

a source of direct voltage;

a first plurality of switching means for selectively connecting one side of said source of voltage to said end terminals and said junction terminals, a second plurality of switching means for selectively connecting the opposite side of said source of voltage to said end terminals and said junction terminals, whereby selective actuation of said first and second switching means controls the direction of energizing current through any of said plurality of solenoid coils; and a first resistor connected between one side of said source of voltage and one of said end terminals and a second resistor connected between the opposite side of said source of voltage and the other of said end terminals, said first and second resistors serving to conduct a sense current through said solenoid coil chain, establishing voltage potentials at said end terminals which vary from a predetermined value during a failure mode of operation of said system, said sense current being insufficient to actuate a movable member associated with a respective solenoid coil.

* * * * *